US012782322B2

(12) United States Patent
Dolby et al.

(10) Patent No.: US 12,782,322 B2
(45) Date of Patent: Nov. 3, 2026

(54) CONTACTLESS DETECTION OF VIBRATIONS IN METAL BELTS

(71) Applicant: Primetals Technologies Germany GmbH, Erlangen (DE)

(72) Inventors: Mark Dolby, Dorset (GB); Simon Hain, Erlangen (DE); David Terry, Dorset (GB)

(73) Assignee: Primetals Technologies Germany GmbH (DE)

( * ) Notice: Subject to any disclaimer, the term of this patent is extended or adjusted under 35 U.S.C. 154(b) by 303 days.

(21) Appl. No.: 18/687,791

(22) PCT Filed: Aug. 22, 2022

(86) PCT No.: PCT/EP2022/073329
§ 371 (c)(1),
(2) Date: Feb. 28, 2024

(87) PCT Pub. No.: WO2023/030948
PCT Pub. Date: Mar. 9, 2023

(65) Prior Publication Data

US 2024/0361279 A1 Oct. 31, 2024

(30) Foreign Application Priority Data

Aug. 30, 2021 (EP) .................................... 21193743

(51) Int. Cl.
*G01N 29/27* (2006.01)
*G01N 29/04* (2006.01)

(52) U.S. Cl.
CPC ............ *G01N 29/27* (2013.01); *G01N 29/04* (2013.01); *G01N 2291/0234* (2013.01); *G01N 2291/2626* (2013.01)

(58) Field of Classification Search
None
See application file for complete search history.

(56) References Cited

U.S. PATENT DOCUMENTS 3,538,765 A 11/1970 Jesinghaus et al.
6,427,507 B1 * 8/2002 Hong ..................... B21B 38/02 73/862.55

(Continued)

FOREIGN PATENT DOCUMENTS

CN 201006548 Y 1/2008
CN 102223959 A 10/2011

(Continued)

OTHER PUBLICATIONS

International Search Report mailed Dec. 8, 2022 in corresponding PCT International Application No. PCT/EP2022/073329.

(Continued)

*Primary Examiner* — Suman K Nath
(74) *Attorney, Agent, or Firm* — OSTROLENK FABER LLP

(57) ABSTRACT

A measuring assembly with a mechanical excitation device that excites the metal belt of a transport device at an excitation frequency (fA) to produce mechanical vibrations. The measuring assembly has a metal plate that faces the metal belt. The metal plate is equipped with sensor elements which are offset relative to one another when viewed in the belt width direction with which measurement signals (MA) that characterize the amplitude (A) of the excited mechanical vibrations are detected for corresponding regions of the metal belt. The sensor elements protrude beyond the upper face of the metal plate and up to the metal belt. A cover for the measuring assembly that is made of an electrically insulating material covers the sensor elements on the upper face thereof, and laterally seals the sensor elements.

12 Claims, 12 Drawing Sheets

(56) References Cited

U.S. PATENT DOCUMENTS

| | | | | |
|---|---|---|---|---|
| 10,775,407 | B2 | 9/2020 | Ehrenpfordt et al. | |
| 2014/0107830 | A1 | 4/2014 | Lange et al. | 700/167 |
| 2019/0206240 | A1* | 7/2019 | Gonçalves | G08G 1/04 |
| 2024/0384977 | A1 | 11/2024 | Dobly et al. | |

FOREIGN PATENT DOCUMENTS

| | | | |
|---|---|---|---|
| CN | 103477221 | A | 12/2013 |
| CN | 103900628 | A | 7/2014 |
| CN | 117897586 | A | 4/2024 |
| DE | 10306746 | A1 | 8/2004 |
| JP | S50-16176 | U | 6/1975 |
| JP | S54-48576 | A | 4/1979 |
| JP | S59-029704 | U | 2/1984 |
| JP | H10-170363 | A | 6/1998 |
| WO | WO 2010/049209 | A1 | 5/2010 |

OTHER PUBLICATIONS

Office Action mailed Jun. 10, 2025, issued in corresponding Japanese Patent Application No. 2024-510706 with English translation.

Notice of Allowance dated Sep. 9, 2025, issued in corresponding Japanese Patent Application No. 2024-510706 with an English translation.

Non-Contact Measurement of Strip Flatness; Steel Times International; Dmg World Media, Lewes, GB; vol. 27; No. 5; pp. 16/17; XP001185774; ISSN: 0143-7798; Jul. 2003.

George F. Kelk et al: "New developments improve hot strip shape: Shapemeter-Looper and Shape Actimeter"; Iron and Steel Engineer; vol. 63; No. 8; pp. 48-56; XP001381359; Aug. 1986.

Office Action dated May 10, 2026 issued in corresponding Chinese Patent Application No. 202280059287.8, with an English translation of Chinese Search Report.

* cited by examiner

CONTACTLESS DETECTION OF VIBRATIONS IN METAL BELTS

CROSS-REFERENCE TO RELATED APPLICATIONS

The present application is a 35 U.S.C. §§ 371 national stage application of International Application No. PCT/EP2022/073329, filed Aug. 22, 2022, which claims priority to European Patent Application No. 21193743.8, filed Aug. 30, 2021, the contents of which are incorporated herein by reference.

FIELD OF TECHNOLOGY

The present invention is based on a measuring arrangement in a transport device for a metal strip,

- wherein the measuring arrangement is arranged between a front device and a rear device of the transport device, said rear device being arranged downstream of the front device,
- wherein the measuring arrangement has a mechanical excitation device by means of which the metal strip can be excited so as to vibrate mechanically in its thickness direction at an excitation frequency,
- wherein the measuring arrangement has a metal plate, the upper side of which faces the metal strip,
- wherein a plurality of sensor elements are arranged in the metal plate,
- wherein the sensor elements are arranged offset from one another as viewed in a width direction of the metal strip,
- wherein it is possible by means of the sensor elements to acquire for each of the multiple areas of the metal strip that are offset from one another in the width direction a measurement signal that is characteristic of the amplitude of the excited mechanical vibration of the respective area of the metal strip.

PRIOR ART

Such a measuring arrangement is known. Reference can be made to WO 98/38482 A1 purely as an example. The flatness of the metal strip can be determined from the determined amplitudes of the mechanical vibrations of the areas of the metal strip. This is also explained in more detail in the aforementioned WO publication. A similar disclosure content can also be found in the technical article "Non-contact measurement of strip flatness" Steel Times International, July/August 2003, pages 16 and 17.

From the technical paper "New developments improve hot strip shape: Shapemeter-Looper and Shape Actimeter" by George F. Kelk et al., Iron and Steel Engineer, August 1986, pages 48 to 56, a measuring arrangement in a transport device for a metal strip is known, in which the measuring arrangement is arranged between a front device and a rear device of the transport device, said rear device being arranged downstream of the front device. The measuring arrangement has a mechanical excitation device by means of which the metal strip can be excited so as to vibrate mechanically in its thickness direction at an excitation frequency. The measuring arrangement also has a metal plate whose upper side faces the metal strip. A plurality of sensor elements is arranged in a substructure below the metal plate. The sensor elements are offset from one another as viewed in the width direction of the metal strip. It is possible by means of the sensor elements to acquire for each of the multiple areas of the metal strip that are offset from one another in the width direction a measurement signal that is characteristic of the amplitude of the excited mechanical vibration of the respective area of the metal strip can be acquired. The sensor elements protrude beyond their surroundings within the substructure.

A measuring arrangement in a transport device for a metal strip is known from U.S. Pat. No. 3,538,765 A, in which the measuring arrangement is arranged between a front device and a rear device of the transport device, said rear device being arranged downstream of the front device. The measuring arrangement has a metal plate, the upper side of which faces the metal strip. A plurality of sensor elements are arranged in the metal plate, offset from one another in the width direction of the metal strip. The sensor elements can be used to acquire a measurement signal for multiple areas of the metal strip that are offset from one another in the width direction. The sensor elements are arranged in the metal plate in such a way that they are flush with the upper side of the metal plate towards the metal strip. A synthetic, abrasion-resistant layer is applied to the upper side of the metal plate. This also appears to apply to the areas where the sensor elements are located.

SUMMARY OF THE INVENTION

When rolling metal strips the flatness of the rolled metal strip is an important quality feature. In particular, it should be avoided that the rolled metal strip becomes wavy after rolling.

For example, a measuring arrangement of the type mentioned above can be used to record the corresponding measured values. In particular, such measuring arrangements have the advantage over conventional measuring arrangements that the signal acquisition is contactless and therefore there is no risk of damaging the metal strip. However, such measuring arrangements also have some disadvantages.

Thus, in practice, for example, the sensor elements are installed in the metal plate in such a way that they are flush with the upper side of the metal plate. As a result, the sensors of the sensor elements—i.e. the elements that acquire the measurement signals—are laterally surrounded by the material of the metal plate. This results in signal attenuation. The acquired measuring signals therefore have a relatively low level and consequently a relatively low signal-to-noise ratio (SNR). Furthermore, in practice the acquired measurement signals are transmitted to the evaluation device as analogue signals via cable. Due to the long cables, distortions caused by temperature influences, crosstalk and other interference are possible. This makes it difficult to evaluate the acquired measurement signals.

The object of the present invention is to create possibilities by means of which the disadvantages of the prior art can be avoided.

The object is achieved by a measuring arrangement with the claimed features. Advantageous embodiments of the measuring arrangement according to the invention are the subject of the dependent claims.

According to the invention, a measuring arrangement of the type mentioned at the beginning is configured as follows,

- that the sensor elements protrude beyond the upper side of the metal plate towards the metal strip and
- that the measuring arrangement has a cover which consists of an electrically insulating material and covers the sensor elements on their upper side and seals them on their sides.

On the one hand, this means that the sensor elements are no longer surrounded by metal on the sides, resulting in higher signal levels and therefore a better signal-to-noise ratio. Nevertheless, the sensor elements are protected from influences emanating from the metal strip due to the cover on their upper side and are protected from other environmental influences such as dust, dirt, water vapor, etc. due to their lateral sealing. The measuring arrangement is therefore very sensitive on the one hand, yet robust on the other.

Preferably, the cover has recesses on its underside that faces the sensor elements, so that a number of flow channels for a cooling medium are formed between the metal plate and the cover, wherein the sensor elements can be cooled by means of said cooling medium. This allows the sensor elements to be kept at a relatively constant temperature so that temperature influences when acquiring the measurement signals do not occur or can at least be minimized. Furthermore, the service life of the sensor elements can be increased by cooling.

The cooling medium is usually a gas. In particular, the cooling medium can be (purified) compressed air. In exceptional cases, however, a liquid can also be used as the cooling medium, for example an oil.

Preferably, the flow channels are designed in such a way that, with respect to one of the flow channels, the sensor elements are arranged sequentially one behind the other as viewed in the direction of flow of the cooling medium. This ensures that all sensor elements of the corresponding flow channel are forcibly cooled by the cooling medium.

It is preferably provided:

that the cover has receptacles for the sensor elements on its underside insofar as these protrude beyond the upper side of the metal plate, that the receptacles each have an inlet for the cooling medium and an outlet for the cooling medium, that the outlet of a respective receptacle is communicatively connected via a respective connecting section of the respective flow channel to the inlet of the respective next receptacle as viewed in the direction of flow of the cooling medium, and that the inlet and outlet of a respective receptacle are arranged opposite each other as viewed from the respective sensor element.

On the one hand, this ensures that the distance between the sensor elements and the metal strip is only slightly increased by the cover. On the other hand, this ensures that the cooling medium that is flowing through the respective flow channel is forced to flow around each sensor element of the respective flow channel, thereby forcing each sensor element to be cooled efficiently.

The mechanical excitation device often has a flat boundary surface that is facing the metal strip. In this case, the upper side of the cover preferably lies in the plane formed by the flat boundary surface. This results in an optimum coordination of the excitation device and the arrangement of the sensor elements including their cover.

The cover must be sufficiently mechanically stable and also sufficiently temperature-resistant. This can be achieved, for example, by the cover being made of ceramic or a (suitable) plastic.

Ceramics are generally dimensionally stable even at higher temperatures. This is not always the case with plastics. However, plastics are also known which are temperature-resistant to the required extent. Examples of such plastics are polyimides and polyester ester ketones (PEEK).

Preferably, channels for a cooling liquid are arranged in the metal plate, wherein the metal plate and thus indirectly also the sensor elements can be cooled by means of said cooling liquid. This can further improve the cooling of the sensor elements.

In a preferred embodiment, the following is also provided, that the sensor elements each have a sleeve with an external thread, that a respective sensor is arranged in the respective sleeve, by means of which one of the measurement signals can be acquired in each case, and that a respective fixing element is applied to the respective sleeve, said fixing element having a collar that projects radially outwards over the respective sleeve in the radial direction.

The sensor element is therefore the mechanical unit that is built into the metal plate. The sensor, on the other hand, is the element of the sensor element that actually acquires the measurement signals. The fixing element is the element that mechanically interacts with the metal plate.

The configuration of the sensor elements with sleeve, sensor and fixing element makes it possible to pre-assemble the sensor elements. In particular, this allows the distance between the upper edge of the sensor and the upper edge and/or the lower edge of the collar to be set precisely during the manufacture of the sensor element. This allows the sensor element to be fixed in a simple manner in the metal plate in such a way that the sensor has a defined distance from the upper side edge of the cover. The connection between the sleeve, sensor and fixing element is preferably non-detachable. For example, the aforementioned elements can be glued together, welded together or soldered together.

Preferably, the metal plate has receptacles for the sensor elements and each of said receptacles in turn has a radially inwardly projecting support ring for the respective collar of the respective sensor element. This allows the sensor elements to be fixed in the metal plate in a simple and precise manner and, above all, with an exact height position (i.e. as viewed in the direction of the metal strip).

Preferably, a plastic hood is applied to the respective sensor on its side facing the metal strip so that the respective sensor is sealed airtight and watertight insofar as it protrudes beyond the metal plate. This protects the sensor even better from environmental influences.

The sensor elements usually comprise eddy current sensors. In this case, the eddy current sensors of sensor elements that are arranged directly adjacent to each other in the metal plate are preferably operated at different operating frequencies. This can significantly reduce crosstalk. The minimum number of operating frequencies is two. In many cases it is three.

Preferably, the sensor elements have a coding that is characteristic of the operating frequency of the respective sensor element. The coding is such that it can be directly perceived by a person with their sensory organs. As a result, the sensor elements can be distinguished from one another by an operator in a quick and simple manner, so that installation of the sensor elements at the "correct" points on the metal plate is guaranteed. The coding can be of a mechanical and/or haptic and/or optical nature as required. In the case of mechanical coding, it may even be possible to make it impossible to install a sensor element in the "wrong" position on the metal plate.

Alternatively or additionally, for example, an evaluation device can check the operating frequency at which the sensor elements are working in each case. In this case, if it is stored in the evaluation device which sensor is to operate at which operating frequency, the evaluation device can carry out the check and issue an error message in the event of an error.

BRIEF DESCRIPTION OF THE DRAWINGS

The characteristics, features and advantages of this invention described above and the manner in which they are achieved will become clearer and more comprehensible in connection with the following description of the embodiments, which will be explained in more detail in connection with the drawings. Hereby in a schematic illustration.

DESCRIPTION OF THE EMBODIMENTS

Figure 1:
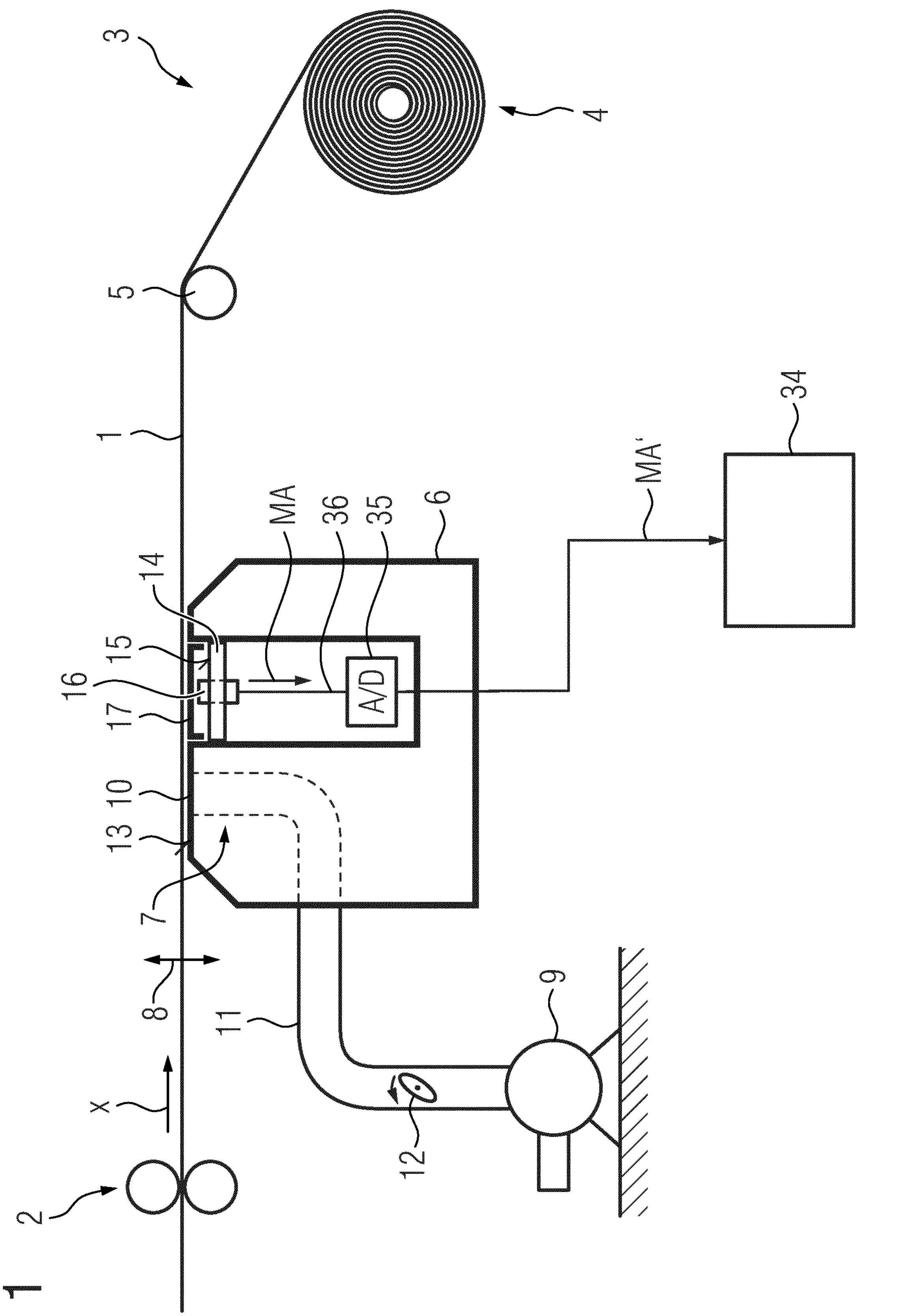
FIG. 1 shows a side view of a rolling facility.

According to FIG. 1, a transport device for a metal strip 1 has a front device 2. The front device is usually a roll stand. Only the working rollers of the roll stand are shown in FIG. 1. However, the roller stand often has additional rollers, for example in the case of a four-high stand, supporting rollers in addition to the working rollers and in the case of a six-high stand, intermediate rollers and supporting rollers in addition to the working rollers. Other configurations are also possible, for example as a 20-roller roll stand or as a 12-roller roll stand.

A further roll stand can be arranged upstream of the roll stand on the in-feed side. Multiple further roll stands can also be arranged upstream of the roll stand on the in-feed side. It is also possible, for example, that a decoiler for uncoiling the metal strip 1 is arranged directly upstream of the roll stand. The front device 2 itself can also be a device other than a roll stand. Examples of such devices are a drive roller set and a decoiler. Which of these embodiments is given is of secondary importance in the context of the present invention. For this reason, the configuration of the rolling facility on the inlet side of the front device 2 is also not shown in the FIGS and is also not explained in more detail.

The transport device also has a rear device 3. The rear device 3 is arranged downstream of the front device 2. The rear device 3 can, for example, comprise a reel 4 and a deflection roller 5 upstream of the reel 4 as shown in FIG. 1. The specific configuration of the downstream device 3 is of secondary importance. The decisive factor is that a pass line for the metal strip 1 is defined by the front device 2 and the rear device 3, along which the metal strip 1 is conveyed in a conveying direction x from the front device 2 to the rear device 3. The conveying direction x is generally horizontal or at least almost horizontal. A transport speed at which the metal strip 1 runs out of the front device 2 can be up to 400 m/min in the case of the configuration of the front device 2 as a roll stand, sometimes even slightly higher.

Various devices can be arranged between the front device 2 and the rear device 3, said various devices being of secondary importance in the context of the present invention, for example a thickness measuring device. The decisive factor in the present case is that a measuring arrangement 6 is arranged between the front device 2 and the rear device 3.

The measuring arrangement 6 has a mechanical excitation device 7. By means of the mechanical excitation device 7, the metal strip 1 can be excited so as to vibrate mechanically in its thickness direction. Specifically, the metal strip 1 is shown in FIG. 1 in a solid line in a center position. The deflection from the center position is indicated in FIG. 1 by a double arrow 8. The excitation to the mechanical vibration takes place at an excitation frequency fA.

The mechanical excitation device 7 can, for example, be designed as a suction device as shown in FIG. 1. This configuration is established, robust and reliable.

For example, a suction fan 9 can extract air from the area between the metal strip 1 and the measuring arrangement 6 via suction openings 10 (see in particular FIGS. 2 and 3; only a few of the suction openings 10 are provided there with their reference character) and a suction channel 11 and thus periodically apply a negative pressure to one side of the metal strip 1. The extent to which air is extracted can be varied by directly activating the suction fan 9 and/or by activating a modulator element 12. If the modulator element 12 is activated, the modulator element 12 periodically varies the prevailing cross-section and thus the flow resistance of the suction duct 11. The modulator element 12 can, for example, be designed as an oval or elliptical element that is rotated in the suction channel 11.

As already mentioned, this configuration is well established. Detailed explanations are therefore not necessary.

In order to be able to cause the metal strip 1 to vibrate effectively, the mechanical excitation device 7 usually has a flat boundary surface 13. The flat boundary surface 13 faces the metal strip 1 and runs at a small distance (usually in the single-digit millimeter range) from the pass line. The suction openings 10 are arranged in the boundary surface 13.

Figure 3:
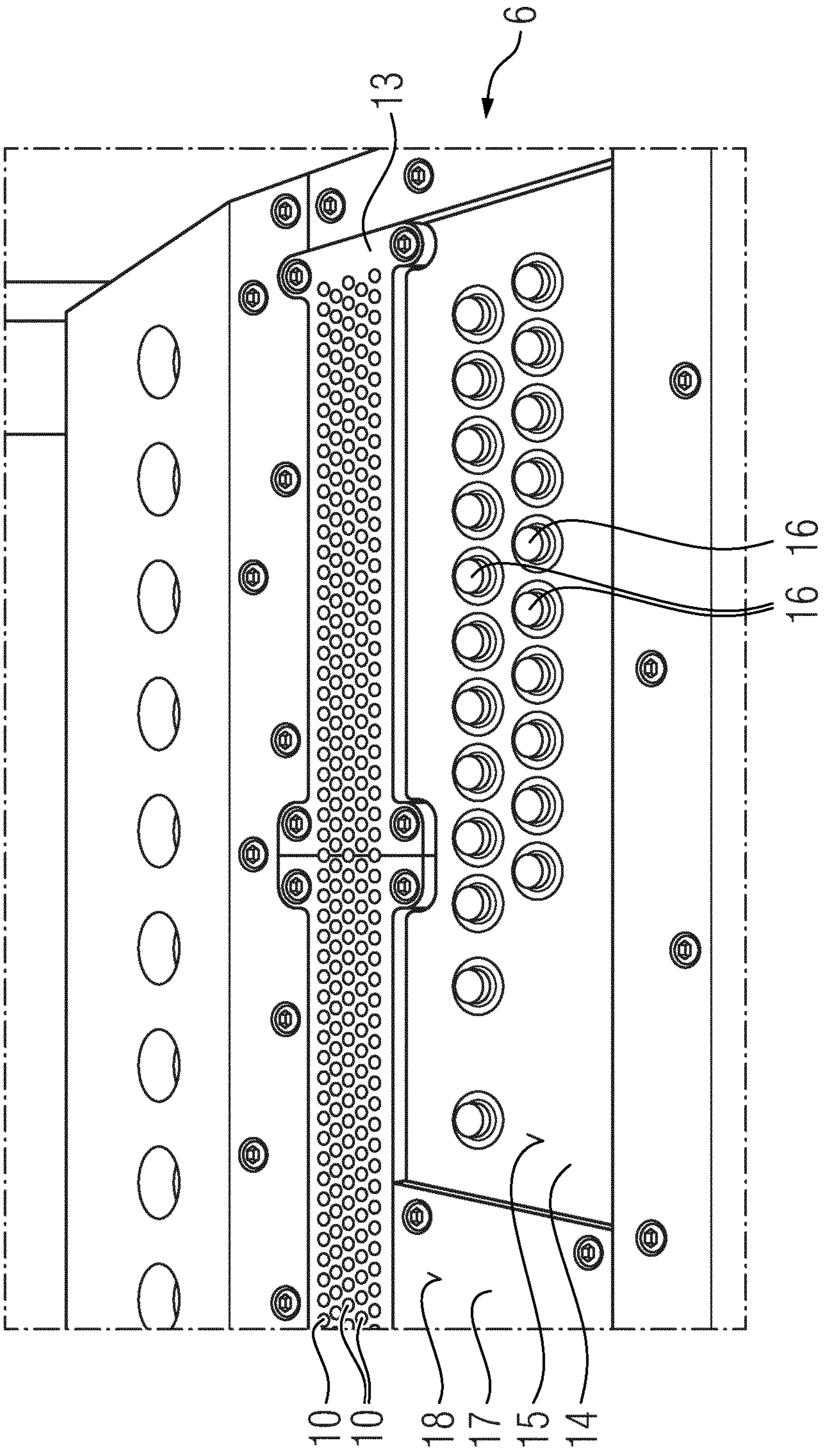
FIG. 3 shows a perspective view from above of a part of the measuring arrangement of FIG. 2, wherein a cover is partially removed.
Figure 4:
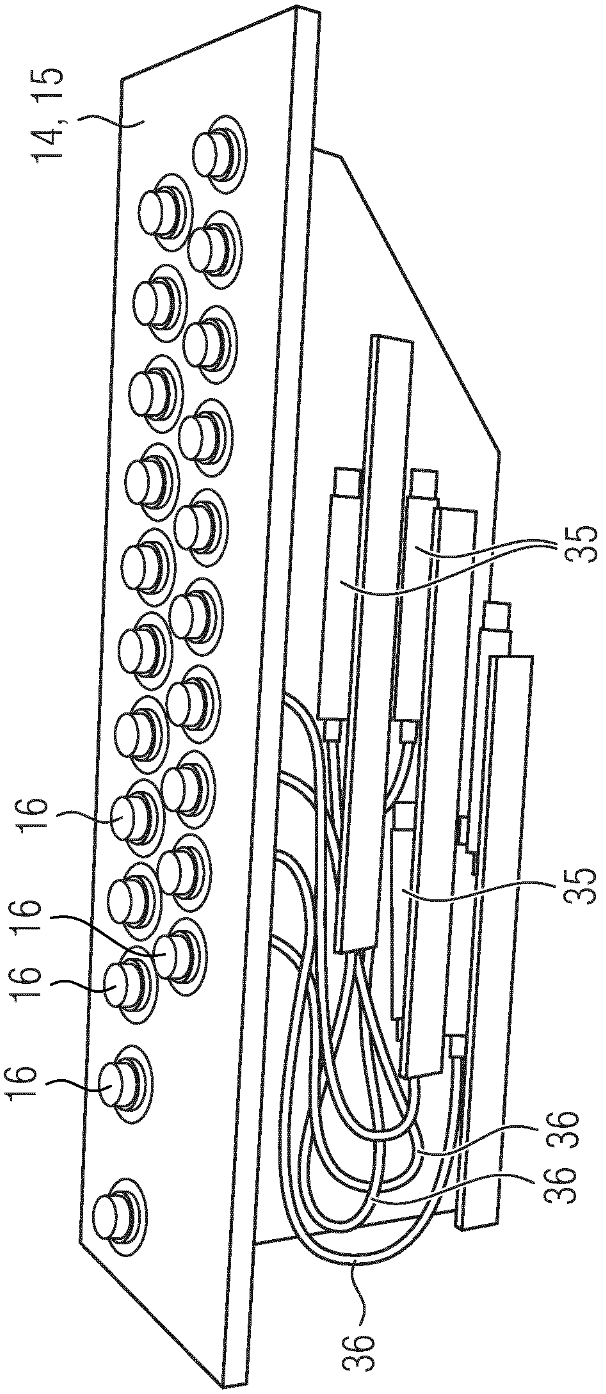
FIG. 4 shows a part of the measuring arrangement of FIGS. 2 and 3.

The measuring arrangement 6 also has a metal plate 14 as shown in FIGS. 3 and 4. The metal plate 14 is arranged next to the boundary surface 13. The metal plate 14 has an upper side 15 that faces the metal strip 1. The metal plate 14 is offset from the boundary surface 13 so that the upper side 15 is at a greater distance from the pass line than the boundary surface 13.

Figure 2:
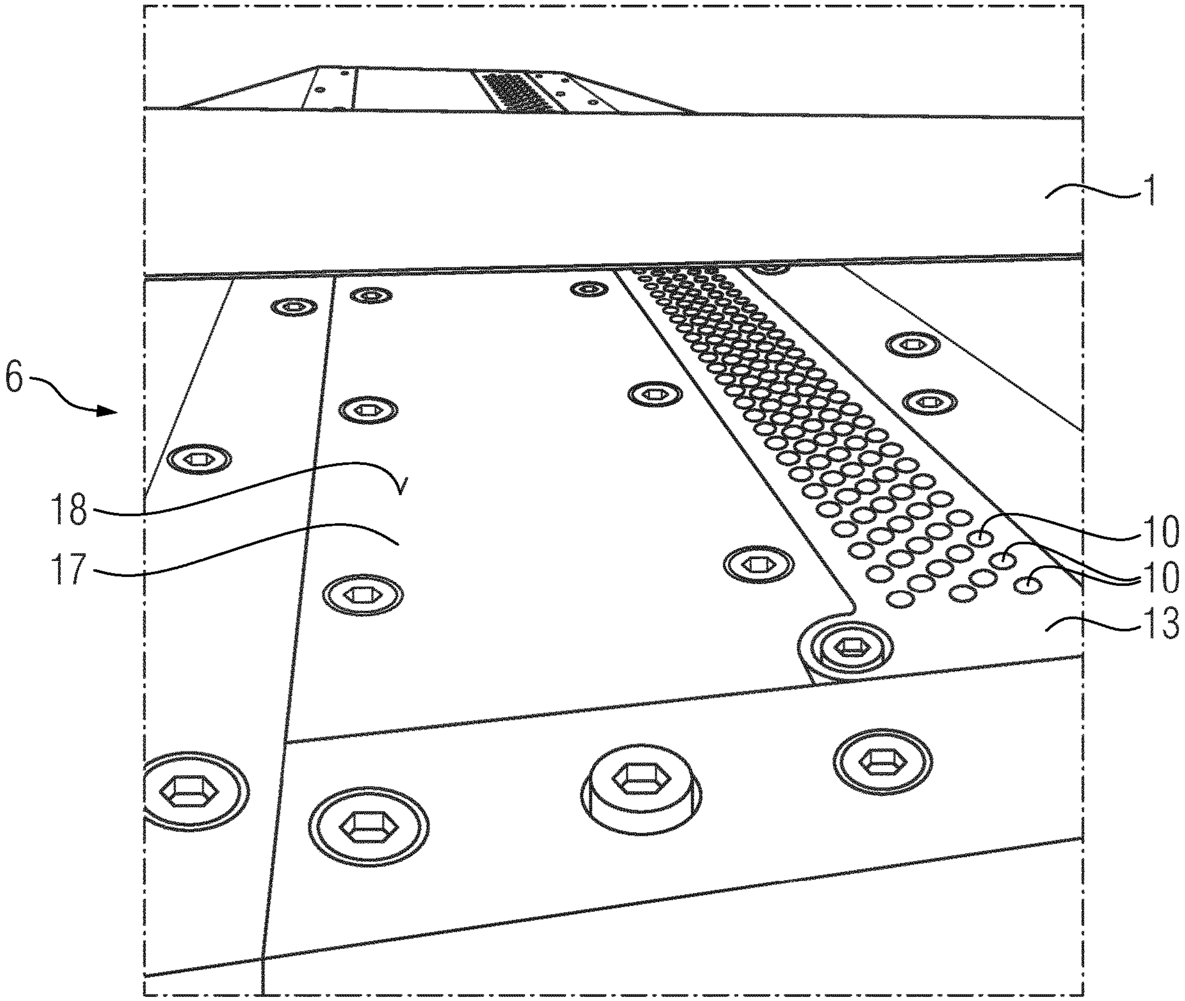
FIG. 2 shows a perspective side view of a metal strip and a measuring arrangement.

A plurality of sensor elements 16 is arranged in the metal plate 14 as shown in FIGS. 1, 3 and 4. The measuring arrangement 6 thus has this plurality of sensor elements 16. For the sake of clarity, only one of the sensor elements 16 is shown in FIG. 1. In FIGS. 3 and 4, only some of the sensor elements 16 are labeled with their reference characters. It is evident that the sensor elements 16 are not flush with the upper side 15 of the metal plate 14, but protrude beyond the upper side 15 towards the metal strip 1. The measuring arrangement 6 therefore has a cover 17. The cover 17 covers the sensor elements 16 on their upper side (i.e. towards the metal strip 1). The cover 17 seals the sensor elements 16 towards the sides of the sensor elements 16. An upper side 18 of the cover 17 lies in the plane formed by the flat boundary surface 13 as shown in FIG. 2.

The cover 17 consists of an electrically insulating material. For example, the cover 17 can be made of a ceramic or a plastic. Suitable ceramics and suitable plastics, for example polyimides and polyester ester ketones (PEEK), are known to those skilled in the art.

The sensor elements 16 are arranged offset from one another as viewed in the width direction of the metal strip 1. In the specific embodiment of the present invention, the sensor elements 16 form two rows, with the corresponding sensor elements 16 being arranged next to one another within the respective row as viewed in the width direction, and the sensor elements 16 of the rows being arranged offset relative to the sensor elements 16 of the other rows as viewed in the width direction in the overall view of the rows. This configuration, i.e. with multiple rows of sensor elements 16 and rows offset from one another, is currently preferred, but is of secondary importance as a result.

It is possible by means of the sensor elements 16 to acquire for a respective area of the metal strip 1 a respective measurement signal MA that is characteristic of the amplitude A of the excited mechanical vibration of the respective area of the metal strip 1. The areas of the metal strip 1 are also offset from one another in the width direction of the metal strip 1 in accordance with the arrangement of the sensor elements 16.

Figure 5:
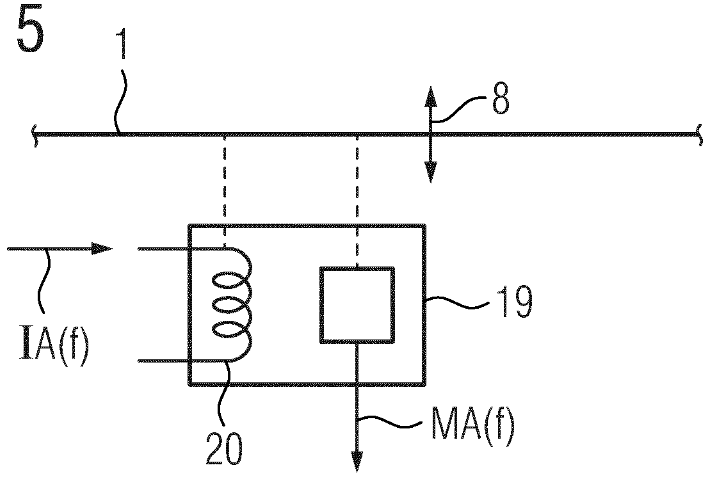
FIG. 5 shows an individual sensor.

The acquisition of the respective measurement signal MA is contactless. Possible configurations for this are generally known to persons skilled in the art. It is preferable that the sensor elements 16 (=assembly unit) comprise eddy current sensors as actual sensors 19 which acquire the respective measurement signal MA. In an eddy current sensor—see FIG. 5 for an individual eddy current sensor—an eddy current is induced in the respective area of the metal strip 1 by means of an excitation current IA of an excitation coil 20. The extent to which the eddy current is induced can be detected. The respective (analogue) measurement signal MA is derived from this extent.

The excitation current IA has an excitation frequency f, hereinafter referred to as the operating frequency so as to distinguish it from the excitation frequency fA. The operating frequency f is usually in the range of multiple kHz, sometimes even in the single-digit MHz range. The measurement signal MA also has the operating frequency f. The respective prevailing distance of the respective area of the metal strip 1 from the measuring arrangement 6 can thus be determined from the measuring signal MA in a manner known per se. The development of this distance over time provides the amplitude A of the mechanical vibration of the corresponding area of the metal strip 1.

This procedure is generally known and familiar to persons skilled in the art. It therefore does not need to be explained in detail.

Figure 6:
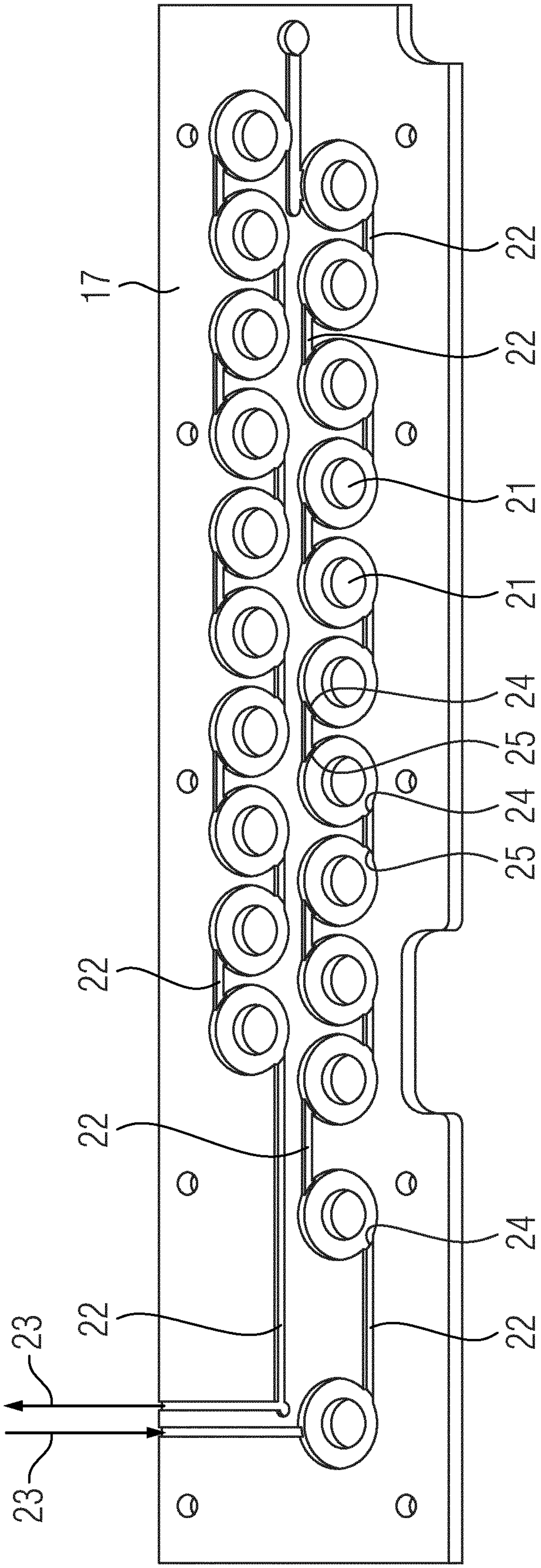
FIG. 6 shows a perspective view of an underside of a cover.

According to FIG. 6, the cover 17 has receptacles 21 on its underside, i.e. the side that faces the sensor elements 16.

When the cover 17 is mounted on the metal plate 14, the sensor elements 16 are immersed in the receptacles 21 (of course only insofar as they protrude beyond the upper side 15 of the metal plate 14).

The cover 17 also has recesses 22 on its underside. In FIG. 6, only some of the recesses 22 are provided with their reference character. The recesses 22 in their entirety form a number of flow channels for a cooling medium 23 between the metal plate 14 and the cover 17. The sensor elements 16 can thus be actively cooled by means of the cooling medium 23.

In the illustration according to FIG. 6, a single flow channel is formed. However, multiple flow channels could also be formed. The following explanations regarding the sequence of sensor elements 16 refer to the respective flow channel. In the case of multiple flow channels, the flow channels are separated from one another. The sensor elements 16 are therefore only integrated into a single flow channel in each case. In the case of multiple flow channels, the following statements are valid for each flow channel individually.

According to FIG. 6, the flow channel is designed in such a way that the sensor elements 16 are arranged sequentially one behind the other as viewed in the direction of flow of the cooling medium 23. The cooling medium 23 therefore first cools one of the sensor elements 16, then the next sensor element 16, then the next sensor element 16 and so on until all sensor elements 16 of the respective flow channel are cooled.

It can also be seen from FIG. 6 that the receptacles 21 each have an inlet 24 for the cooling medium 23 and each have an outlet 25 for the cooling medium 23. In FIG. 6, the inlets 24 and the outlets 25 are only provided with their reference characters for some of the receptacles 21 for the sake of clarity. On the one hand, it can be seen that the outlet 25 of a respective receptacle 21 is communicatively connected to the inlet 24 of the respective next receptacle 21 via a respective connecting section of the respective flow channel. The term "next receptacle" in this context refers to the next receptacle 21 as viewed in the direction of flow of the cooling medium 23. On the other hand, the inlet 24 and the outlet 25 of a respective receptacle 21 are arranged opposite each other as viewed from the respective sensor element 16. As a result, the respective sensor element 16 is completely surrounded by the cooling medium 23 and thus cooled.

The cooling medium 23 can be (purified) compressed air, for example. This configuration offers the additional advantage that minor leakages are not critical. This is because the compressed air has a higher pressure than the ambient air. Despite the leakage no foreign bodies can therefore penetrate into the space that is covered by the cover 17. Nevertheless, the cooling of the sensor elements 16 can be maintained if the leakage is small enough.

Figure 7:
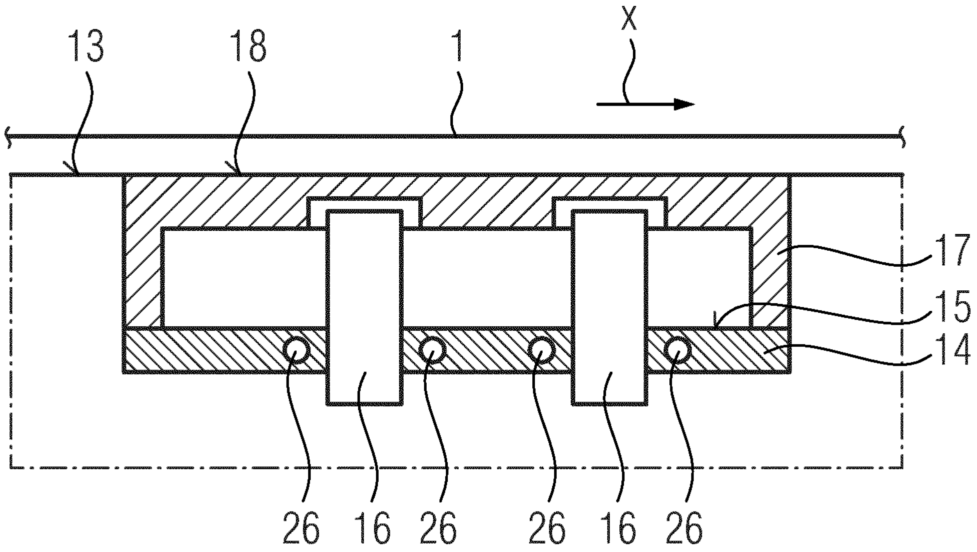
FIG. 7 shows a section through a metal plate and a cover.

In some cases, it may be sufficient to cool the sensor elements 16 solely with the cooling medium 23. In other cases, it is necessary to arrange channels 26 for a cooling liquid in the metal plate 14 as shown in the schematic diagram in FIG. 7. In this case, the metal plate 14 is cooled directly by the cooling liquid. Indirectly, the sensor elements 16 are also cooled as a result.

The structure of an individual sensor element 16 is explained in more detail below in conjunction with FIGS. 8 and 9.

Figure 8:
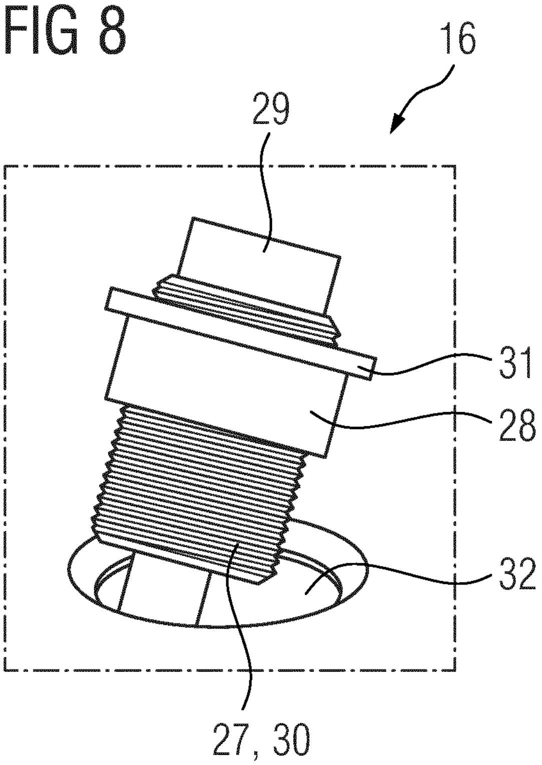
FIG. 8 shows an individual sensor element.
Figure 9:
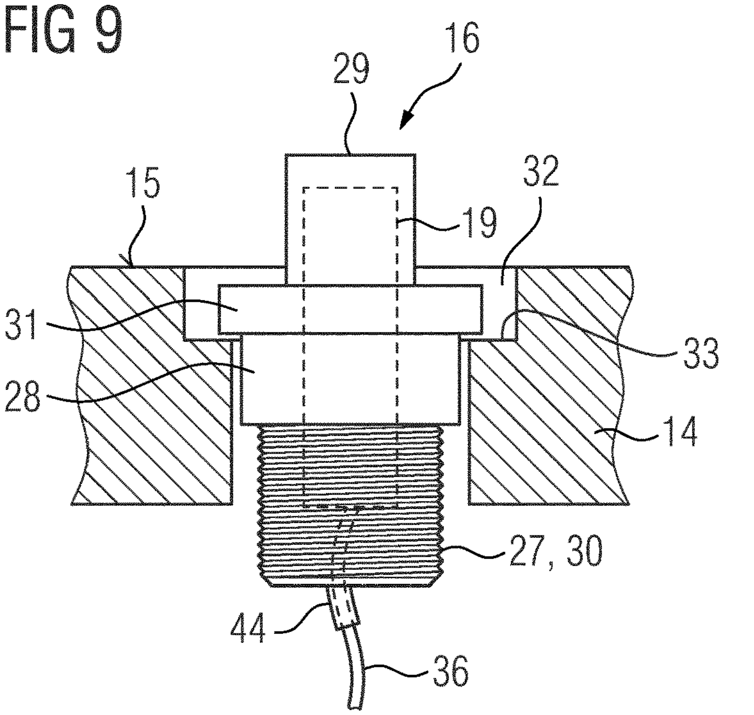
FIG. 9 shows a section of the metal plate and an individual sensor element.

According to FIGS. 8 and 9, the sensor elements 16 are pre-assembled units consisting of multiple components. These components are—in addition to the sensor 19, by means of which the respective measuring signal MA is acquired-a sleeve 27 and a fixing element 28. In addition, a plastic hood 29 can be applied to the sensor 19 itself on its side that later faces the metal strip 1. By means of the plastic hood 29 (if present), the sensor 16 (insofar as it protrudes beyond the metal plate 14 in the mounted state) is sealed airtight and watertight.

According to FIG. 8, the sensor 19 (possibly including the plastic hood 29) is arranged in the sleeve 27. The sleeve 27 in turn has an external thread 30. The fixing element 28 is attached to the sleeve 27. The fixing element 28 thus has a corresponding internal thread (not shown). The fixing element 28 has a collar 31 which projects radially outwards over the sleeve 27 in the radial direction.

The components, i.e. the sensor 19, the sleeve 27 and the fixing element 28, are fixed relative to each other. For example, the sensor 19 can be glued into the sleeve 27 and the fixing element 28 can be fixed to the sleeve 27 via soldering points or spot welds. When mounting the sensor element 16, the distance between the lower edge or the upper edge of the collar 31 and the upper side of the sensor 19 (or, if present, the upper side of the plastic hood 29) can be set in a defined manner. For example, the sensor 19 can be fixed in the sleeve 27 first. Before or after this, the plastic hood 29 can be placed on the sensor 19 if necessary. The distance between the lower edge or the upper edge of the collar 31 is then set. Only finally is the fixing element 28 fixed to the sleeve 27.

The metal plate 14 has—see in particular FIG. 9—receptacles 32 for the sensor elements 16. The receptacles 32 in turn each have a radially inwardly projecting support ring 33. When the corresponding sensor element 16 is mounted in the corresponding receptacle 32, the collar 31 thus rests on the support ring 33.

As already explained above, the sensor elements 16 can be used to acquire a respective measurement signal MA for the areas of the metal strip 1. The acquisition is contactless, usually via eddy current sensors. For this purpose, the eddy current sensors have excitation coils 20 to which excitation currents IA of multiple kHz, sometimes even in the single-digit MHz range, are applied. The acquired measurement signals MA are initially analogue.

Figure 10:
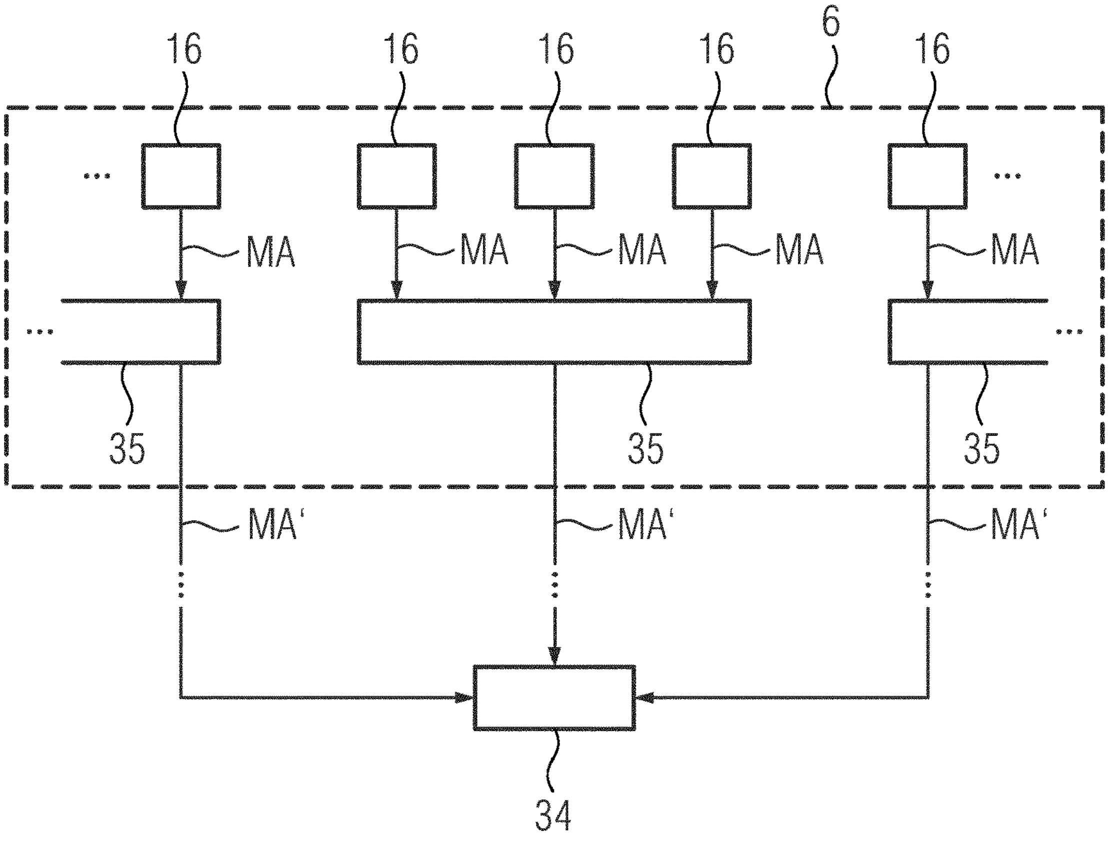
FIG. 10 shows sensor elements and digitization devices.

In the prior art, the measurement signals MA are transmitted via corresponding cables to an evaluation device 34 (see FIGS. 1 and 10) which is arranged outside the measuring arrangement 6, usually in a control cabinet. In the context of the present invention, however, digitization devices 35 are arranged inside the measuring arrangement 6. FIG. 1 shows an individual one of the digitization devices 35, FIG. 10 shows a few of the digitization devices 35. The acquired analogue measurement signals MA are digitized by means of the digitization devices 35.

As in the prior art, the evaluation device 34 is arranged outside the measuring arrangement 6, for example in a control cabinet. In the simplest case, the digitization devices 35 transmit the digitized measurement signals themselves to the evaluation device 34 as transmitted signals MA'. Alternatively, the digitization devices 35 can transmit signals derived from the digitized measurement signals to the evaluation device 34 as transmitted signals MA'.

The arrangement of the digitization devices 35 within the measuring arrangement 6 can be as required. For example, the digitization devices 35 can be designed as independent elements separate from the sensor elements 16 as shown in FIGS. 1, 10, 11 and 12. In this case, the digitization devices 35 are connected to the sensor elements 16 within the measuring arrangement 6 via cables 36. With regard to their arrangement, the digitization devices 35 can be arranged below the metal plate 14 in particular. The cables 36 are generally very short (usually a maximum of 100 cm, often only 50 cm or less).

Figure 11:
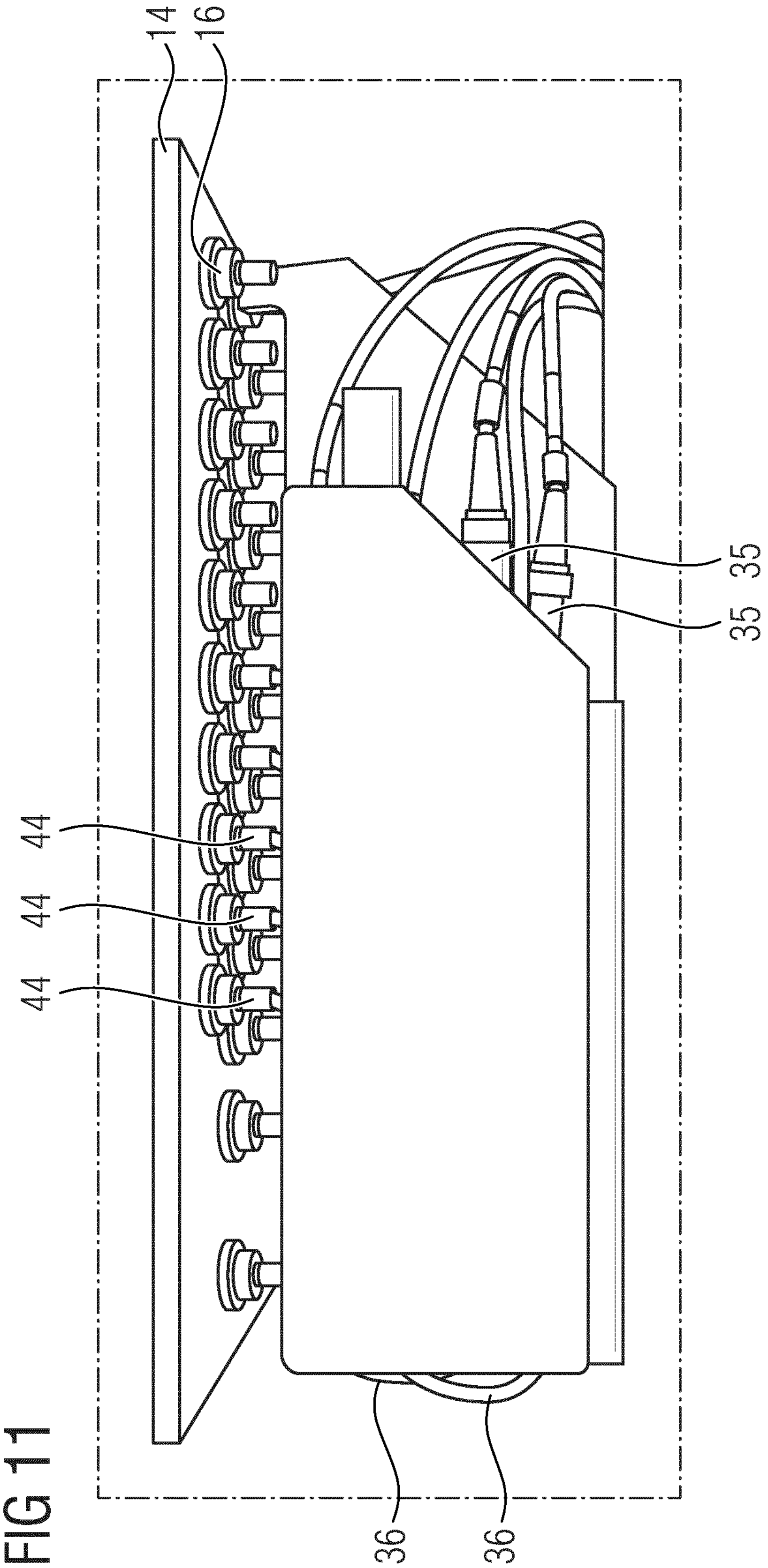
FIG. 11 shows an installation unit comprising a metal plate with sensor elements and digitization devices.
Figure 12:
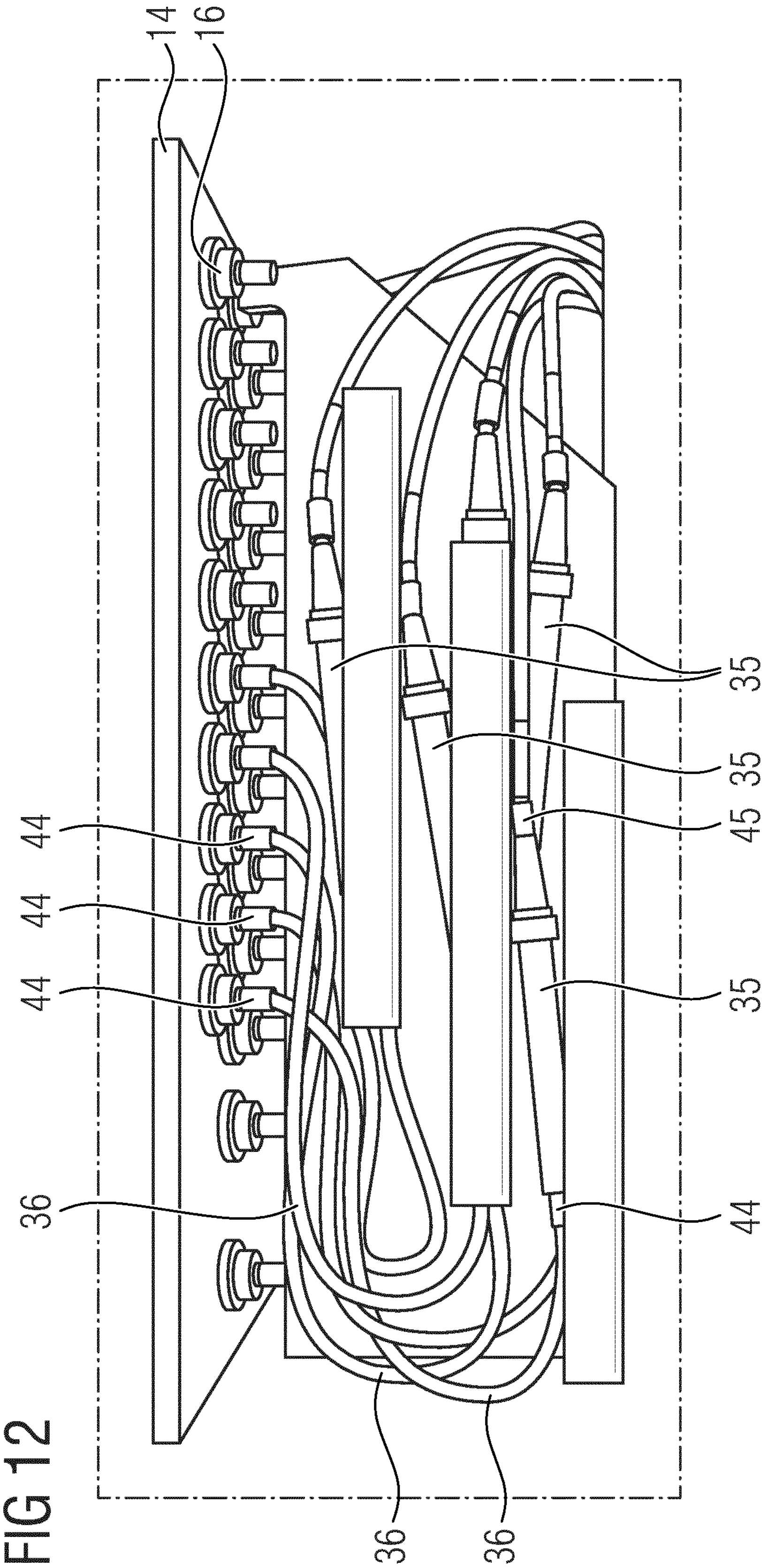
FIG. 12 shows the installation unit of FIG. 11 with a removed cover plate.

The digitization devices 35 are shown in FIGS. 11 and 12—see also FIG. 4—as cigar-like elements. The word "cigar-like" in this context refers both to the basic shape (an elongated cylinder) and to the absolute dimensions (length approx. 15 cm to 30 cm, diameter approx. 1.0 cm to 3.0 cm). This form of the digitization devices 35 is currently preferred, but in no way mandatory.

The cables 36 are generally detachably connected to the digitization devices 35, for example via a screw connection or a bayonet-type connection. At the transition to the sensor elements 16, the cables 36 are preferably hermetically sealed (i.e. airtight and watertight). The seal can be made, for example, as is known for the spark plug connectors of motor vehicle engines, by means of rubber-elastic sleeves which are slidably arranged on the corresponding cable 36. Alternatively—and this is currently preferred—the cables 36 can be non-detachably connected to their respective sensor element 16.

Figure 13:
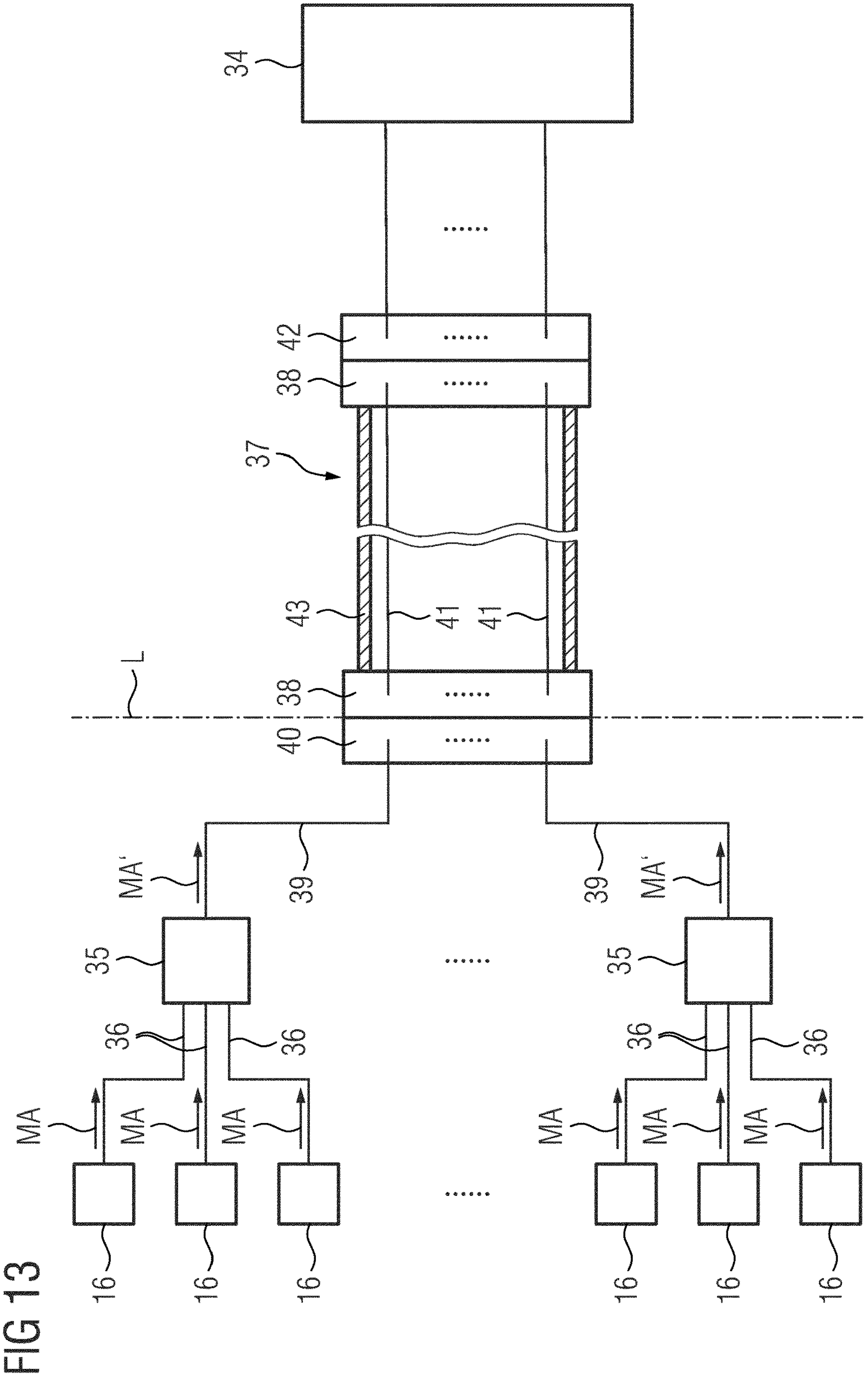
FIG. 13 shows a method of signal transmission.

With regard to the connection of the digitization devices 35 to the evaluation device 34, it is possible in principle to establish the connection via individual corresponding connection cables, as is done for the transmission of the analogue measurement signals MA in the prior art. However, it is preferable if the transmitted signals MA' are transmitted to the evaluation device 34 via a common armored cable 37 with pre-assembled connections 38 as shown in FIG. 13. This is explained in more detail below.

According to FIG. 13, individual lines or thin cables 39 run from the digitization devices 35 to a pre-assembled plug connection 40. One of the pre-assembled connections 38 of the armored cable 37, which is arranged at one end of the armored cable 37, can be plugged onto the pre-assembled plug connection 40. Within the armored cable 37, lines 41 that correspond to the individual lines or thin cables 39 are routed to the other pre-assembled connection 38, which is arranged at the other end of the armored cable 37. This pre-assembled connection 38 is connected to a further plug connection 42, from which lines are routed to the evaluation device 34.

The armoring 43 of the armored cable 37 can, for example, correspond to that which is usual for hydraulic lines whose hydraulic fluid is under a pressure in the range from 100 bar to 500 bar.

The dashed line L in FIG. 13 is intended to indicate the boundary of the measuring arrangement 6. As shown in FIG. 13, the armored cable 37 can therefore be connected from outside the measuring arrangement 6 without having to open the measuring arrangement 6. Alternatively, it is of course also possible to arrange the pre-assembled plug connection 40 inside the measuring arrangement 6.

FIG. 13 also shows another preferred embodiment. In this embodiment, the armored cable 37 comprises in each case dedicated lines 41 for the transmitted signals MA' of groups of multiple sensor elements 16 in each case. Specifically, the digitized measurement signals of three sensor elements 16 are combined in the digitization devices 35 in each case. The number "three" is of secondary importance in this context.

Figure 14:
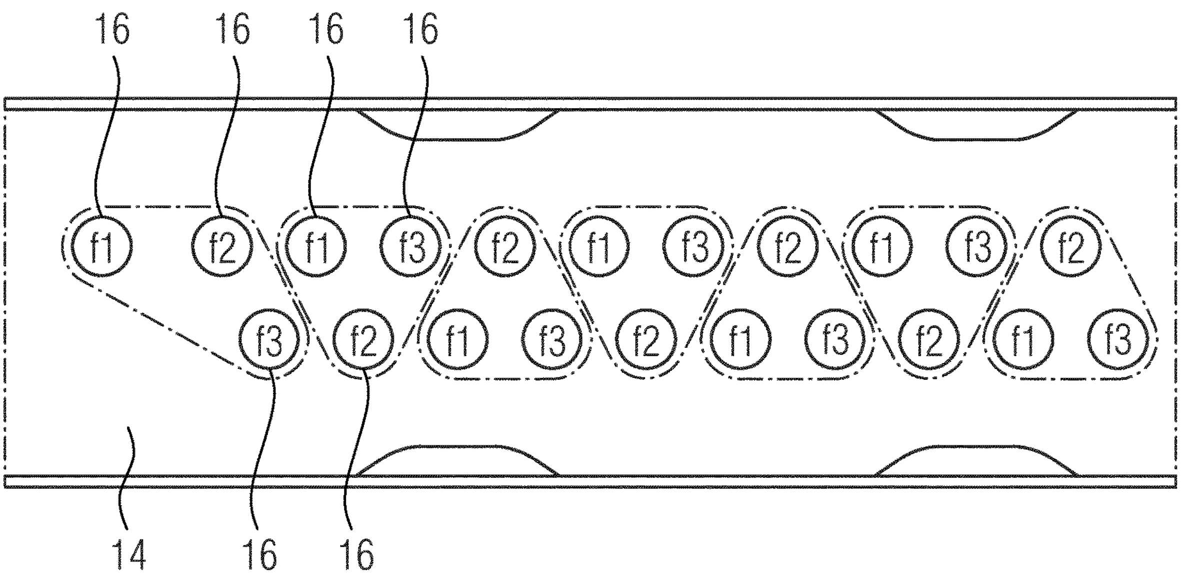
FIG. 14 shows an assignment of operating frequencies to sensor elements and FIG. 15 shows a possible evaluation of transmitted signals.

FIG. 14 shows a schematic plan view of the sensor elements 16, i.e. as viewed from the metal strip 1. Reference characters f1, f2 and f3 are drawn in the sensor elements 16. f1, f2 and f3 are also operating frequencies—analogous to the operating frequency f. However, they differ from one another in pairs. For example, the operating frequency f1 can have the value 280 kHz, while the operating frequency f2 has the value 300 kHz and the operating frequency f3 has the value 320 kHz. The values mentioned are, of course, purely exemplary.

It is evident that the eddy current sensors of sensor elements 16, which are arranged directly adjacent to each other in the metal plate 14, are operated at mutually different operating frequencies f1, f2, f3. This allows any crosstalk behavior to be significantly reduced.

In the case of mutually different operating frequencies f1, f2, f3, it is also possible, as shown in FIGS. 13 and 14, that the number of sensor elements 16 whose digitized measurement signals are transmitted via an individual one of the lines 41 is equal to the number of operating frequencies f1, f2, f3. In this case, the sensor elements 16 can in particular be grouped in such a way that each operating frequency f1, f2, f3 is represented once in the groups. In FIG. 14, the corresponding groups are framed in dashed lines.

In the case of mutually different operating frequencies f1, f2, f3, the sensor elements 16 preferably have a coding 44 as shown in FIGS. 11 and 12 (see also FIG. 9 for an individual sensor element 16). The coding 44 is characteristic of the operating frequency f1, f2, f3 of the respective sensor element 16. The coding 44 can be of an optical nature. For example, different colors can be used for the different operating frequencies f1, f2, f3, for example red, green and blue or yellow, red and blue. The coding 44 can also be of a haptic nature. For example, the operating frequency f1 can be coded by a circumferential ring on the cable 36, while the operating frequencies f2 and f3 can be coded by two circumferential rings on the cable 36, wherein the distinction between the operating frequency f2 and the operating frequency f3 can be made by the distance between the two rings. A further operating frequency f could, for example, be coded by three such rings. Mechanical coding is also possible in a similar way.

Preferably, the digitization devices 15 also have a corresponding coding 45, so that the correct assignment is also readily apparent.

Figure 15:
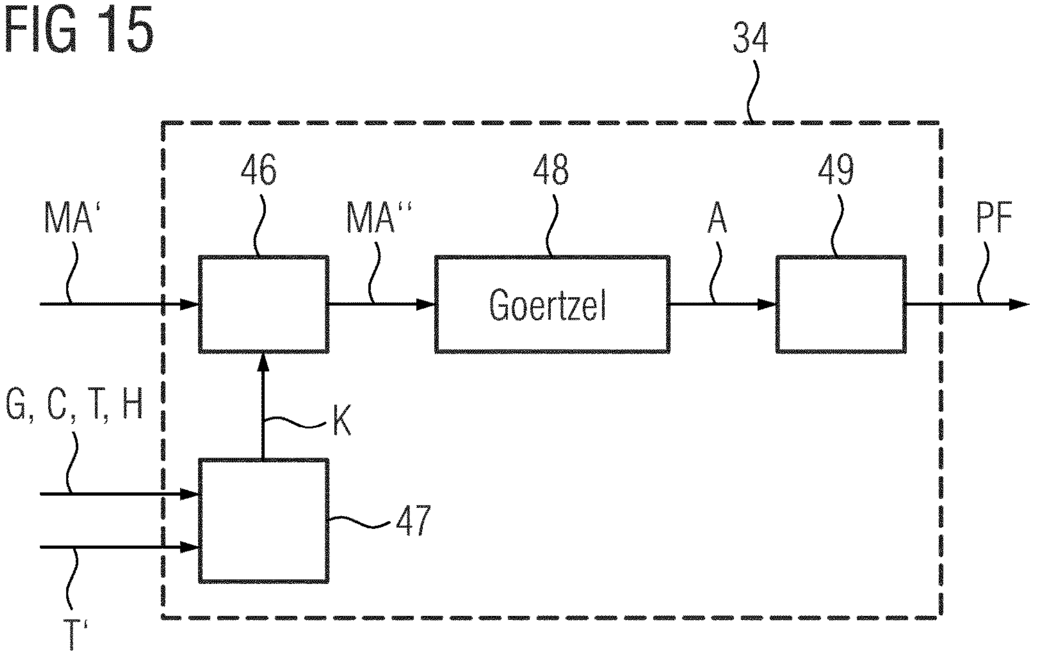

As shown in FIG. 15, the evaluation device 34 receives the transmitted (digital) signals MA' from the digitization devices 35. As part of an evaluation of the transmitted signals MA', it determines the amplitude A of the mechanical vibration of the metal strip 1 for the respective area of the latter.

In order to determine the amplitudes A, the evaluation device 34 first performs a linearization of the transmitted signals MA' in a linearization block 46. The linearization block 46 thus outputs modified signals MA", the respective value of which is proportional to the corresponding deflection of the respective area of the metal strip 1 at the time at which the corresponding (analogue) measurement signal MA was acquired. As part of the linearization process, the evaluation device 34 evaluates a characteristic curve K. The characteristic curve K is determined by the evaluation device 34 specifically for the metal strip 1. It can be determined, for example, as a function of geometric properties G and/or chemical properties C and/or thermodynamic properties T (for example temperature) and/or the history H of the metal strip 1. If necessary, an operating temperature T' of the sensor elements 16 can also be taken into account when determining the characteristic curve K.

In order to determine the characteristic curve K, for example, the associated characteristic curves K can be stored in a determination device 47 for specific values of the geometric properties G, the chemical properties C, etc., so that the characteristic curve K actually utilized can be determined by selection and/or interpolation.

The modified signals MA" are fed to a determination block 48 within the evaluation device 34. In the determination block 48, the evaluation device 34 determines the respective amplitude A of the excited mechanical vibration of the metal strip 1 for the areas of the metal strip 1. In the context of determining the amplitudes A, the evaluation device 34 preferably uses a Goertzel algorithm as shown in FIG. 15. It is particularly preferred that the evaluation device 34 takes into account the excitation frequency fA within the Goertzel algorithm.

The determined amplitudes A can be fed to a further determination block 49. In the determination block 49, the evaluation device 34 uses the amplitudes A to determine a flatness error PF for each of the areas of the metal strip 1. The determination of the flatness errors PF as such is no longer the object of the present invention. The evaluation device 34 can, for example, output the determined flatness errors PF to a control device (not shown) for the front device 2, so that the control device can activate flatness actuators of the front device 2 in such a way that the flatness errors PF are eliminated as far as possible.

The present invention has many advantages. The use of the cover 17 improves the sensitivity of the sensors 19. The replacement of the sensor elements 16 is significantly simplified. By configuring the sensor elements 16 as pre-assembled units, the positioning of the sensor elements 16 in the metal plate 14 can also be ensured reliably and precisely. This also applies to the subsequent replacement of a defective sensor element 16 with a new sensor element 16. The configuration of the sensor elements 16 as pre-assembled units also reduces the protection of the sensors 19 against moisture, dirt and, within limits, against high heat input. This improves the durability of the sensor elements 16. The cooling of the sensor elements 16 by means of the cooling medium 23 also provides improved protection against dirt and moisture. Crosstalk can be largely eliminated by using multiple operating frequencies f1, f2, f3. Thanks to the very early digitization of the measurement signals MA within the measuring arrangement 6, the measurement signals MA can be converted very quickly into a form that is immune to interference. This enables, among other things, an increase in the analyzable measuring range. Evaluation in conjunction with characteristic curves K, which are specific to the metal strip 1, also enables improved evaluation and evaluation in an enlarged measuring range. By using the characteristic curve K, an evaluation of the measurement signals MA is possible that is optimized for the respective metal strip 1. The evaluation using a Goertzel algorithm provides superior results with reduced computational effort.

Although the invention has been illustrated and described in detail by the preferred exemplary embodiment, the invention is not limited by the disclosed examples and other variants can be derived by the person skilled in the art without departing from the scope of protection of the invention.

List of reference characters

| | |
|---|---|
| 1 | Metal strip |
| 2 | Front device |
| 3 | Rear device |
| 4 | Reel |
| 5 | Deflection pulley |
| 6 | Measuring arrangement |
| 7 | Mechanical excitation device |
| 8 | Double arrow |
| 9 | Suction fan |
| 10 | Suction openings |
| 11 | Suction channel |
| 12 | Modulator element |
| 13 | Boundary surface |
| 14 | Metal plate |
| 15, 18 | Upper side |
| 16 | Sensor elements |
| 17 | Cover |
| 19 | Sensors |

-continued

| List of reference characters | |
|---|---|
| 20 | Excitation coil |
| 21, 32 | Receptacles |
| 22 | Recesses |
| 23 | Cooling medium |
| 24 | Inlets |
| 25 | Outlets |
| 26 | Channels |
| 27 | Sleeve |
| 28 | Fixing element |
| 29 | Plastic hood |
| 30 | External thread |
| 31 | Collar |
| 33 | Support ring |
| 34 | Evaluation device |
| 35 | Digitization devices |
| 36 | Cables |
| 37 | Armored cable |
| 38 | Pre-assembled connections |
| 39 | Wires or thin cables |
| 40, 42 | Plug connections |
| 41 | Lines of the armored cable |
| 43 | Armoring |
| 44, 45 | Coding |
| 46 | Linearization block |
| 47 | Determination device |
| 48, 49 | Determination blocks |
| A | Amplitudes |
| C | Chemical properties |
| f, f1 to f3 | Operating frequencies |
| fA | Excitation frequency |
| G | Geometric properties |
| H | History |
| IA | Excitation current |
| K | Characteristic curves |
| L | Line |
| MA | Analogue measurement signal |
| MA' | Transmitted signals |
| MA" | Modified signals |
| PE | Flatness error |
| T | Thermodynamic properties |
| T' | Operating temperature |
| x | Conveying direction |

The invention claimed is:

1. A measuring arrangement in a transport device for a metal strip, wherein the measuring arrangement is arranged between a front device and a rear device of the transport device, said rear device being arranged downstream of the front device, wherein the measuring arrangement has a mechanical excitation device by means of which the metal strip can be excited so as to vibrate mechanically in its thickness direction at an excitation frequency (fA), wherein the measuring arrangement has a metal plate, the upper side of which faces the metal strip, wherein a plurality of sensor elements is arranged in the metal plate, wherein the sensor elements are arranged offset relative to one another as viewed in a width direction of the metal strip, wherein it is possible by means of the sensor elements to acquire for each of the plurality areas of the metal strip which are offset relative to one another in the width direction a measurement signal (MA) that is characteristic of the amplitude (A) of the excited mechanical vibration of the respective area of the metal strip, wherein:

the sensor elements project towards the metal strip beyond the upper side of the metal plate, the measuring arrangement has a cover which consists of an electrically insulating material and covers the sensor elements on their upper side and seals them on their sides, and the cover has recesses on its underside that faces the sensor elements, so that a number of flow channels for a cooling medium is formed between the metal plate and the cover, wherein the sensor elements can be cooled by means of said cooling medium.

2. The measuring arrangement as claimed in claim 1, wherein the flow channels are designed in such a way that, with respect to one of the flow channels, the sensor elements are arranged sequentially one behind the other as viewed in the direction of flow of the cooling medium.

3. The measuring arrangement as claimed in claim 2, wherein:

the cover has receptacles for the sensor elements on its underside, insofar as these project beyond the upper side of the metal plate, the receptacles each have an inlet for the cooling medium and an outlet for the cooling medium, the outlet of a respective receptacle is communicatively connected via a respective connecting section of the respective flow channel to the inlet of the respective next receptacle as viewed in the direction of flow of the cooling medium, and the inlet and the outlet of a respective receptacle are arranged opposite one another as viewed from the respective sensor element.

4. The measuring arrangement as claimed in claim 1, wherein the mechanical excitation device has a flat boundary surface that faces the metal strip.

5. The measuring arrangement as claimed in claim 4, wherein an upper side of the cover lies in the plane that is formed by the plane boundary surface.

6. The measuring arrangement as claimed in claim 1, wherein the cover consists of a ceramic or a plastic.

7. The measuring arrangement as claimed in claim 1, wherein:

the sensor elements each have a sleeve with an external thread, in the respective sleeve a respective sensor is arranged, by means of which in each case one of the measurement signals (MA) can be acquired, and a respective fixing element is applied to the respective sleeve, said fixing element having a collar that projects radially outwards over the respective sleeve in the radial direction.

8. The measuring arrangement as claimed in claim 7, wherein the metal plate has receptacles for the sensor elements, which in turn each have a radially inwardly projecting support ring for the respective collar of the respective sensor element.

9. The measuring arrangement as claimed in claim 7, wherein a plastic hood is applied to the respective sensor on its side that faces the metal strip, so that the respective sensor, insofar as it projects beyond the metal plate, is sealed in an airtight and watertight manner.

10. A measuring arrangement in a transport device for a metal strip, wherein the measuring arrangement is arranged between a front device and a rear device of the transport device, said rear device being arranged downstream of the front device, wherein the measuring arrangement has a mechanical excitation device by means of which the metal strip can be excited so as to vibrate mechanically in its thickness direction at an excitation frequency (fA), wherein the measuring arrangement has a metal plate, the upper side of which faces the metal strip, wherein a plurality of sensor elements is arranged in the metal plate, wherein the sensor elements are arranged offset relative to one another as viewed in a width direction of the metal strip, wherein it is possible by means of the sensor elements to acquire for each of the plurality areas of the metal strip which are offset relative to one another in the width direction a measurement signal (MA) that is characteristic of the amplitude (A) of the excited mechanical vibration of the respective area of the metal strip, wherein:

the sensor elements project towards the metal strip beyond the upper side of the metal plate, the measuring arrangement has a cover which consists of an electrically insulating material and covers the sensor elements on their upper side and seals them on their sides, and channels for a cooling liquid are arranged in the metal plate, wherein the metal plate and thus indirectly also the sensor elements can be cooled by means of said cooling liquid.

11. A measuring arrangement in a transport device for a metal strip, wherein the measuring arrangement is arranged between a front device and a rear device of the transport device, said rear device being arranged downstream of the front device, wherein the measuring arrangement has a mechanical excitation device by means of which the metal strip can be excited so as to vibrate mechanically in its thickness direction at an excitation frequency (fA), wherein the measuring arrangement has a metal plate, the upper side of which faces the metal strip, wherein a plurality of sensor elements is arranged in the metal plate, wherein the sensor elements are arranged offset relative to one another as viewed in a width direction of the metal strip, wherein it is possible by means of the sensor elements to acquire for each of the plurality areas of the metal strip which are offset relative to one another in the width direction a measurement signal (MA) that is characteristic of the amplitude (A) of the excited mechanical vibration of the respective area of the metal strip, wherein:

the sensor elements project towards the metal strip beyond the upper side of the metal plate, the measuring arrangement has a cover which consists of an electrically insulating material and covers the sensor elements on their upper side and seals them on their sides, and the sensor elements comprise eddy current sensors and in that the eddy current sensors of sensor elements that are arranged directly adjacent in the metal plate are operated at mutually different operating frequencies (f1, f2, f3).

12. The measuring arrangement as claimed in claim 11, wherein the sensor elements have a coding which is characteristic of the operating frequency (f1, f2, f3) of the respective sensor element.

* * * * *